United States Patent [19]

White

[11] Patent Number: 5,452,020

[45] Date of Patent: Sep. 19, 1995

[54] CATHODE RAY TUBE DRIVER WITH INPUT BLACK TRACKING PROVISIONS

[75] Inventor: Charles M. White, Noblesville, Ind.

[73] Assignee: Thomson Consumer Electronics, Inc., Indianapolis, Ind.

[21] Appl. No.: 298,535

[22] Filed: Aug. 30, 1994

Related U.S. Application Data

[63] Continuation of Ser. No. 14,183, Feb. 5, 1993, abandoned.

[51] Int. Cl.⁶ ............................................. H04N 5/57
[52] U.S. Cl. .................................. 348/687; 348/571
[58] Field of Search ............... 358/169, 168, 242, 243; H04N 5/57, 5/16, 5/20, 5/59; 348/687, 689, 691, 695, 696, 571

[56] References Cited

U.S. PATENT DOCUMENTS

| | | | |
|---|---|---|---|
| 4,096,517 | 6/1978 | Hinn | 358/40 |
| 4,126,884 | 11/1978 | Shanley | 358/168 |
| 4,489,349 | 12/1984 | Okada | 358/168 |
| 4,589,019 | 5/1986 | Dischert | 358/169 |
| 4,660,083 | 4/1987 | Allen | 358/168 |
| 4,691,235 | 9/1987 | Okui | 358/168 |
| 4,811,101 | 3/1989 | Yagi | 348/696 |
| 5,162,902 | 11/1992 | Bell | 358/168 |

FOREIGN PATENT DOCUMENTS

0184056  8/1986  Japan .......................... H04N 5/16

Primary Examiner—James J. Groody
Assistant Examiner—Chris Grant
Attorney, Agent, or Firm—Joseph S. Tripoli; Peter M. Emanuel

[57] ABSTRACT

In a video display system including a cathode ray tube (CRT) as a display device and video output amplifiers for amplifying relatively low level red, green an blue video input voltages to produce respective relatively high level video output voltages suitable for application to the CRT, a "black tracking" circuit is coupled to the inputs of video output amplifiers. Voltage to current converters are utilized as preamplifiers for the video output amplifiers. The "black tracking" circuit includes terminating resistors connected at one end to respective outputs of the voltage to current converters for converting output currents of the converters to respective ones of the low level video input voltages, and a common resistor connected between the other ends of the terminating resistors and a signal ground point. A filter capacitor is connected in parallel with the common resistor. A common "black tracking" voltage representative of the average picture level of a reproduced image is developed across the common resistor and, as a result of the connection to individual ones of the terminating resistors, is added to each one of the low level video input voltages at the inputs of respective ones of the video output amplifiers.

8 Claims, 2 Drawing Sheets

CATHODE RAY TUBE DRIVER WITH INPUT BLACK TRACKING PROVISIONS

This is a continuation of application Ser. No. 08/014,183 filed Feb. 5, 1993, now abandoned.

FIELD OF THE INVENTION

The invention concerns a driver for a cathode ray tube (CRT) as may be employed in a television receiver or other video display system with provisions for inhibiting performance degradation due to CRT power supply loading.

BACKGROUND OF THE INVENTION

In video display systems utilizing a cathode ray tube (CRT) as the display device, a video output or driver stage is employed to amplify relatively low level video signals so as to produce relatively high level video signals suitable for direct application to the CRT. The high level video output signals typically are representative of red, green and blue components of the reproduced image, and are coupled to respective cathodes of the CRT. High supply voltages are coupled to the anode and various grids of the CRT from respective high voltage power supplies. As the average level of the reproduced image tends toward white, the currents drawn from the high voltage supplies increase, and in extreme cases may cause one or more of the high voltages to decrease in amplitude or "slump". The latter may cause the cutoff level of the CRT to increase resulting in the loss of detail in dark portions of the image.

A solution to the above described problem is to employ high voltage power supplies with sufficient current handling capabilities. However, such supplies are expensive. A more cost effective solution is illustrated in FIG. 1.

The final stages of the red (R), green (G) and blue (B) channels of a video display system are shown in FIG. 1. Since the three channels are substantially identical, only the red channel will be described in detail. The relatively low level red video signal which is developed at the output of pre-amplifier 10R, is amplified by driver 12R, and the resultant relatively high level red video signal is coupled through a resistor 14R to a respective cathode 16R of a CRT 18. A common first grid G1 of cathode 18 receives a supply voltage from a G1 voltage supply 20. A common second or screen grid G2, a common first focus grid F1, and a common second focus grid F2 receive respective relatively higher voltages from respective outputs of a high voltage section 22. A very high voltage is coupled to anode A of CRT 18 from another output of high voltage section 22.

Driver 12R comprises NPN transistors Q1 and Q2 connected in a cascode amplifier configuration. The output of preamplifier 10R is coupled to the base of transistor Q1. A reference voltage VREF is coupled to the emitter of transistor through an emitter resistor RE. A bias voltage +VCC is coupled to the base of transistor Q2. The collector of transistor Q2 is coupled to a source of supply voltage B+ through a load, shown simply as a resistor RL, and a resistor RS, the purpose of which will be described below. The collector of transistor Q2 is also coupled through a resistor 14R to cathode 16R. A filter capacitor CS is coupled between the junction of load RL and resistor RS and signal ground. The cutoff level of CRT 18 is a function of reference voltage VREF and bias voltage VCC. The network including resistor RS and capacitor CS is provided to reduce the possibility of the loss of details in dark portions of the image during high average picture level images, as will now be explained.

Decreasing cathode voltage corresponds to increasing the "whiteness" of the image and increasing cathode voltage corresponds to increasing the "blackness" of the image. The beam current drawn by CRT 18 from high voltage section 22 increases as the average picture level increases toward white. The voltages supplied to anode and various grids of CRT 18 by high voltage network 22 tend to decrease at relatively high beam currents. If the cathode voltage were to remain constant, this would cause the cutoff level of CRT 18 to increase and cause dark areas of the image to get darker, with a resulting loss of detail. However, resistor RS produces a voltage drop which decreases the cathode voltage as the beam current increases. The voltage drop developed across resistor RS compensates for the reduction in amplitude (or "slump") of the high voltages supplied by high voltage network 22 and therefore inhibits the loss of detail in dark areas as the average picture level increases. Thus, resistor RS can be thought of as providing a "black tracking" function which operates by reducing the effective supply voltage of B+ voltage supply 24 with increases of beam current. Capacitor CS is required to remove the AC component at the effective supply voltage terminal at the junction of resistors RS and RL.

While the network including resistor RS and capacitor CS performs its intended function satisfactorily, it does have certain drawbacks. The value of resistor RS has to be relatively large for the intended compensation function. However, as a consequence, the "head-room" of the driver, i.e., the amplitude range of the output signal of the driver, is restricted. In addition, since the B+ voltage is relatively high (e.g., +220 volts), the physical size of capacitor CS is large, even for small capacitance values.

SUMMARY OF THE INVENTION

In accordance with the present invention, a black tracking arrangement is coupled to the input of the CRT driver stage rather than to its output. Specifically, the arrangement comprises a circuit for sensing at least one relatively low level video signal coupled to the an input of a CRT drive amplifier and a circuit for developing a signal representing the average level of the sensed low level video signal. The representative signal is coupled to the CRT driver and is effectively added to the output video signal of the CRT driver such that there is an increasing shift or offset of the output video signal in the white direction as the the average level of the input video signal of the CRT drive amplifier increasingly corresponds to white. Preferably, the representative signal is added to the input signal of the CRT drive amplifier.

In a preferred embodiment of the invention, a resistive element is coupled in shunt with the output of a current amplifier comprising a pre-amplifier of a CRT drive amplifier, and in series relationship with a low pass filter element. The representative signal is developed by the low pass filter element, and, by the nature of the series connection, is added to the input video signal. As a further feature of the preferred embodiment, the low pass filter element is connected in common with at least another resistive element coupled in shunt with another pre-amplifier of another CRT drive amplifier so as to develop a signal representative of the average level of the combination of the two video input signals. The later arrangement provides a more reliable indication of the image content than one in which only a single input signal is utilized.

These and other aspects of the invention will be described in detail with reference to the accompanying Drawing.

DETAILED DESCRIPTION OF THE DRAWING

Figure 1:
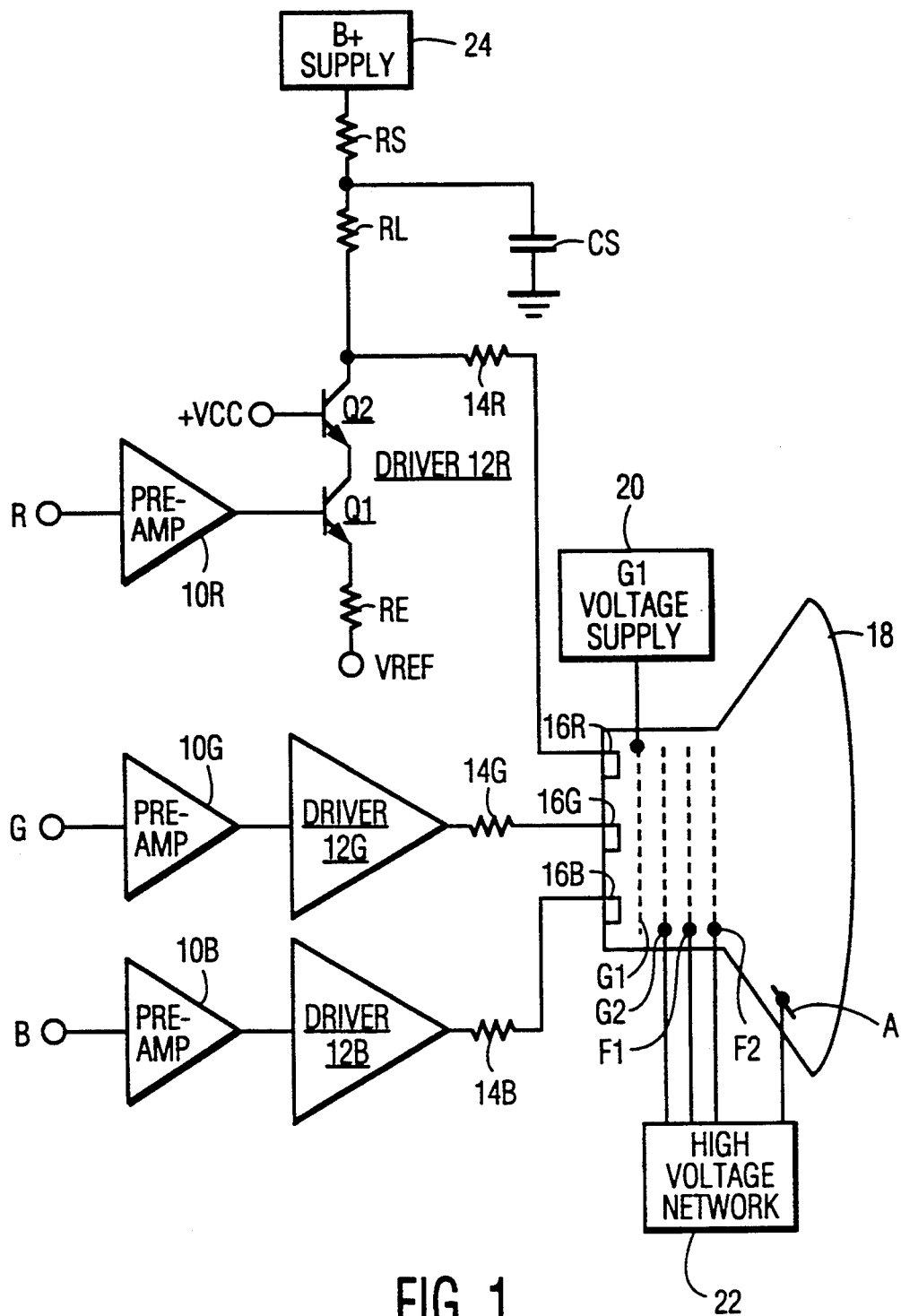
FIG. 1, previously described, is a schematic diagram of a CRT drive arrangement with a black-tracking network coupled to the output of the drive amplifier, as known in the prior art.
Figure 2:
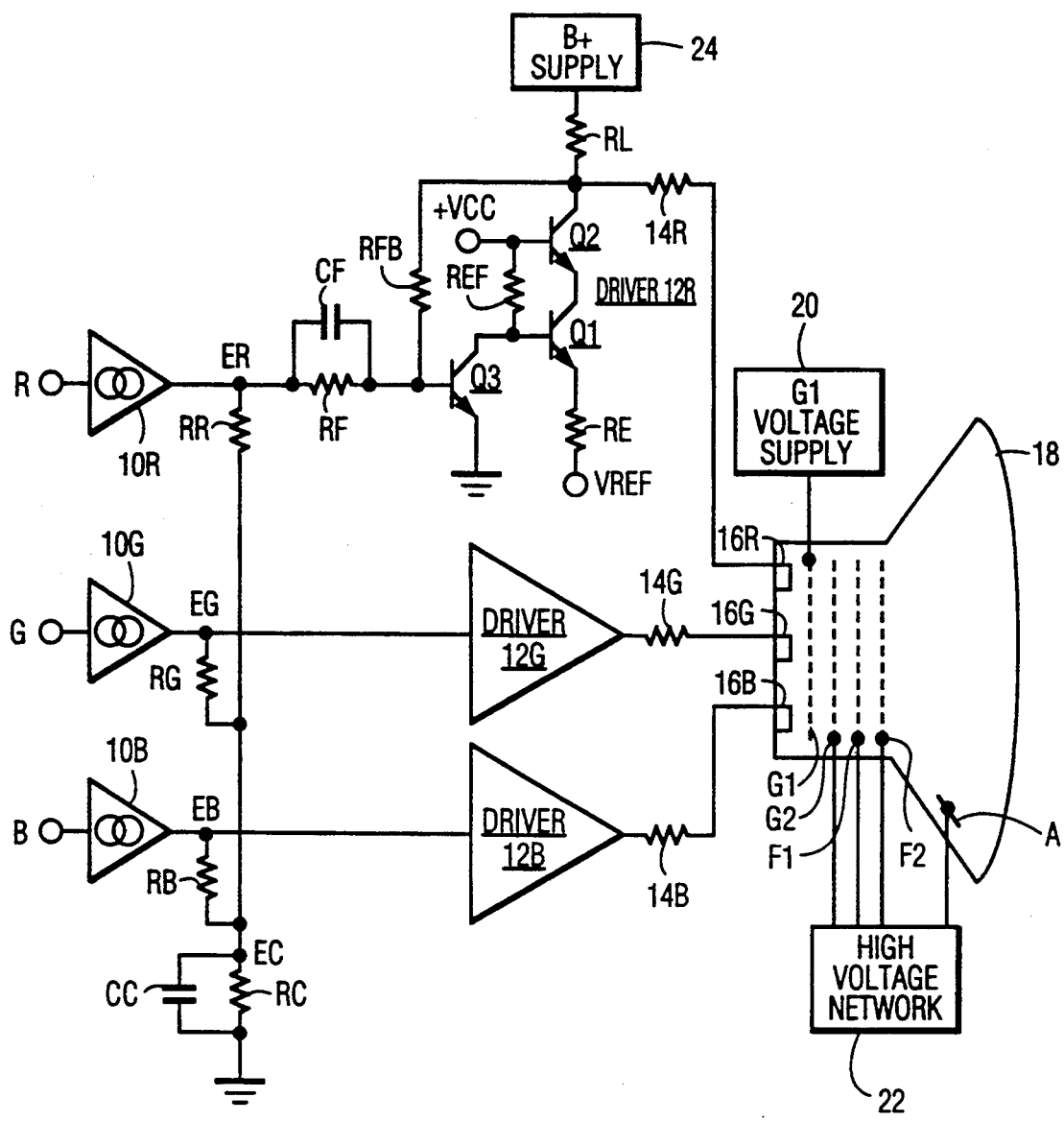
FIG. 2 is a schematic diagram of a CRT drive arrangement with a black-tracking network coupled to the input of drive amplifier, in accordance with the present invention.

In FIGS. 1 and 2, the same or corresponding elements have the same reference designators. Those portions of the arrangement of FIG. 2 for which there are corresponding portions in the arrangement of FIG. 1 will not be described again. As with the arrangement shown in FIG. 1, only the red channel will be described in detail since all three channels are substantially identical.

In the arrangement shown in FIG. 2, preamplifier 10R comprises a voltage to current converter (indicated by the overlapping circles) which converts the input low level red video signal to a corresponding output current. A terminating resistor RR connected in shunt with the the output of pre-amplifier 10R is used to develop an input voltage ER for driver 12R.

Driver 12R of the arrangement shown in FIG. 2 is similar to driver 12R shown in FIG. 1, but is somewhat more complex since it is a practical realization. It will also be appreciated by those skilled in the art that the load of driver 12R may be more complex than a resistor and may include active devices. For example the load of driver 12R may comprise complementary transistors configured as respective emitter-follower amplifiers and connected in a "push-pull" arrangement. Low level input voltage ER is coupled to the base of transistor Q1 through a filter network including the parallel combination of a resistor RF and a capacitor CF and an emitter-follower amplifier comprising a PNP transistor Q3. A resistor REF connected between the emitter of transistor Q3 and the +VCC supply point is the load resistor of the emitter-follower amplifier. The collector of transistor Q3 is connect to a point of ground potential. A resistor RFB is connected between the collector of transistor Q2 and the base of transistor Q3 to provide negative feedback for drive amplifier 12R.

Resistor RR along with corresponding resistors RG and RB of the green and blue channels, and the parallel combination of a resistor RC and a capacitor CC connected between respective ends of resistors RR, RG and RB and a signal ground point, form a an input black tracking network for the CRT drive arrangement in accordance with the present invention. Resistor RC is a common mode terminating resistor which converts the sum of the output currents of pre-amplifiers 10R, 10G and 10B to a voltage EC. Capacitor CC is a filter capacitor which serves to filter voltage EC so that voltage EC only reflects the low frequency components of the sum of the video input currents.

Each of drive amplifier input voltages ER, EG and EB is the sum of the voltage developed across the respective one of terminating resistors RR, RG and RB and voltage EC. The voltage EC represents the average picture level (APL). In the present embodiment, in which driver amplifiers 12R, 12G and 12B are inverting amplifiers, as the APL moves toward white, the voltage EC increases. As the APL moves toward black, the voltage EC decreases. Accordingly, as the APL increases toward white, each of the driver input voltages ER, EG and EB is increasingly shifted or offset in the white-going direction, i.e., is increasingly shifted higher. Correspondingly, each of the driver output voltages at respective Q2 collectors is increasingly shifted in the white-going direction, i.e., is increasingly shifted lower. This has the effect of compensating for the "slump" of the high voltages coupled to CRT 18 as the APL moves toward white. Conversely, as the APL moves toward black, each input voltage is decreasingly shifted lower and each output voltage is decreasingly shifted higher. Thus, with the arrangement shown in FIG. 2, a "black tracking" voltage is added to each driver input voltage. The magnitude of the "black tracking" voltage is determined by the ratio of the value of resistors RR, RG and RB (which are assumed to to be of equal value in this embodiment) and the value of resistor RC.

Compared with the black tracking arrangement shown in FIG. 1, the black tracking arrangement shown in FIG. 2 does not restrict the head room of the CRT drive signals. In addition, it does not require a physically large filter capacitor such as capacitor CS of the arrangement shown in FIG. 1 because the voltage developed across capacitor CC is relatively low.

While it is desirable that all three low level video signals be summed to form the black tracking voltage to obtain a relatively accurate representation of the image content, it is possible to use less than all in some applications. This and other modifications are intended to be within the scope of the present invention defined by the following claims.

I claim:

1. In a video display system including a cathode ray tube (CRT) for reproducing an image; apparatus comprising:

means for providing a video input signal to an input;

means including a low pass filter element and being responsive to said video input signal for generating an offset component representative of the average picture level of said image;

means including a DC impedance element coupled in series with said low pass filter element between said input and a point of reference potential for combining said offset component and said video input signal to generate a combined signal; and means for amplifying said combined signal to produce a relatively high level video signal output suitable for application to said CRT.

2. The apparatus recited in claim 1, wherein:

said means for providing said video input signal includes a voltage to current converter for providing said video input signal as a current.

3. In a video display system including a cathode ray tube (CRT) for reproducing an image; apparatus comprising:

means for providing a first video input signal to a first input;

means for providing a second video input signal to a second input;

means including a low pass filter element and being responsive to said first and second video input signals for generating an offset component representative of the average picture level of said image;

means including a first DC impedance element coupled in series with said low pass filter element between said first input and a point of reference potential for combining said offset component with said first video input signal to generate a first combined signal;

means including a second DC impedance element coupled in series with said low pass filter element between said second input and said point of reference potential for combining said offset component with said second video input signal to generate a second combined signal;

means for amplifying said first combined signal to produce a first relatively high level video output signal suitable for application to said CRT; and means for amplifying said second combined signal to produce a second relatively high level video output signal suitable for application to said CRT.

4. The apparatus recited in claim 3, wherein:

said means for providing said first video input signal includes a first voltage to current converter for providing said first video input signal as a first current; and said means for providing said second video input signal includes a second voltage to current converter for providing said second video input signal as a second current.

5. In a video display system for reproducing images on a CRT, apparatus comprising:

means for providing a relatively low level video input signal to an input;

means receiving said video input signal provided to said input for amplifying said video input signal to produce a relatively high level video output signal suitable for application to said CRT at an output;

means including a low pass filter element and being responsive to said low level video input signal for producing an offset signal representing the average picture level of an image represented by said video input signal; and means including a DC impedance element coupled in series with said low pass filter element means between said input and a point of reference potential for coupling said offset signal to said means for amplifying so that said video output signal is shifted by an amount corresponding to said offset signal.

6. The apparatus recited in claim 5, wherein:

said low pass filter element comprises a capacitor having first and second terminals;

said DC impedance element comprises resistor; and said resistor is coupled between said first terminal of said capacitor and said input, and said capacitor terminal of said capacitor is coupled to said point of reference potential.

7. In a video display system for reproducing images on a CRT, apparatus comprising:

means for providing a first relatively low level video input signal to a first input;

means for providing a second relatively low level video input signal to a second input;

first means receiving said first video input signal provided to said first input for amplifying said first video input signal to produce a first relatively high level video output signal suitable for application to said CRT at a first output;

second means receiving said second video input signal provided to said second input for amplifying said second video input signal to produce a second relatively high level video output signal suitable for application to said CRT at a second output;

means including a low pass filter element and being responsive to said first low level video input signal and to said second low level video input signal for producing an offset signal representing the average picture level of an image represented by said first and second video input signals;

means including a first DC impedance element coupled in series with said low pass filter element, between said first input and a point of reference potential for coupling said offset signal to said first means for amplifying so that said first video output signal is shifted by an amount corresponding to said offset signal; and means including a second DC impedance element coupled in series with said low pass filter element between second input and said point Of reference potential for coupling said offset signal to said second means for amplifying so that said second video output signal is shifted by an amount corresponding to said offset signal.

8. The apparatus recited in claim 7, wherein:

said low pass filter element comprises a capacitor having first and second terminals;

said first DC impedance element comprises a first resistor;

said second DC impedance element comprises a second resistor;

said first resistor is coupled between Said first terminal of said capacitor and said first input of said first means for amplifying, and said second terminal of said capacitor is coupled to said point of reference potential; and said second resistor is coupled between said first terminal of said capacitor and said second input of said second means for amplifying.

* * * * *